United States Patent [19]

Jezo et al.

[11] Patent Number: 4,559,606

[45] Date of Patent: Dec. 17, 1985

[54] ARRANGEMENT TO PROVIDE AN ACCURATE TIME-OF-ARRIVAL INDICATION FOR A RECEIVED SIGNAL

[75] Inventors: Maurice L. Jezo, Cedar Grove; Ning H. Lu, Parsippany, both of N.J.

[73] Assignee: International Telephone and Telegraph Corporation, New York, N.Y.

[21] Appl. No.: 512,280

[22] Filed: Jul. 11, 1983

[51] Int. Cl.$^4$ ............................................. G06F 15/336
[52] U.S. Cl. .......................................... 364/728; 364/715
[58] Field of Search ................. 364/728, 819, 715, 569

[56] References Cited

U.S. PATENT DOCUMENTS

| | | | |
|---|---|---|---|
| 4,007,330 | 2/1977 | Winters | 364/728 |
| 4,007,331 | 2/1977 | Flanagan | 364/728 |
| 4,209,835 | 6/1980 | Guadagnolo | 364/715 |
| 4,283,767 | 8/1981 | Rountree | 364/728 |

Primary Examiner—David H. Malzahn
Attorney, Agent, or Firm—John T. O'Halloran; Peter R. Ruzek

[57] ABSTRACT

The arrangement comprises a plurality of correlation means coupled to the received signal with the received signal being clocked into each of the plurality of correlation means by a different one of a plurality of different phased clocks with the different phased clocks occurring at a predetermined different time uniformly spaced over a given time interval and integration means coupled to each of the plurality of correlation means to provide the indication of the time of arrival of the received signals. The plurality of correlation means includes a plurality of shift registers into which the received signals are shifted by a different one of the plurality of phased clocks, a reference signal register and a plurality of comparison means each coupled to each stage of a different one of the plurality of shift registers and each stage of the common reference signal shift register to compare the contents of the associated stages of the plurality of signal shift registers and the single common reference signal shift register and to produce an output signal indicative of the results of each of the comparisons.

6 Claims, 3 Drawing Figures

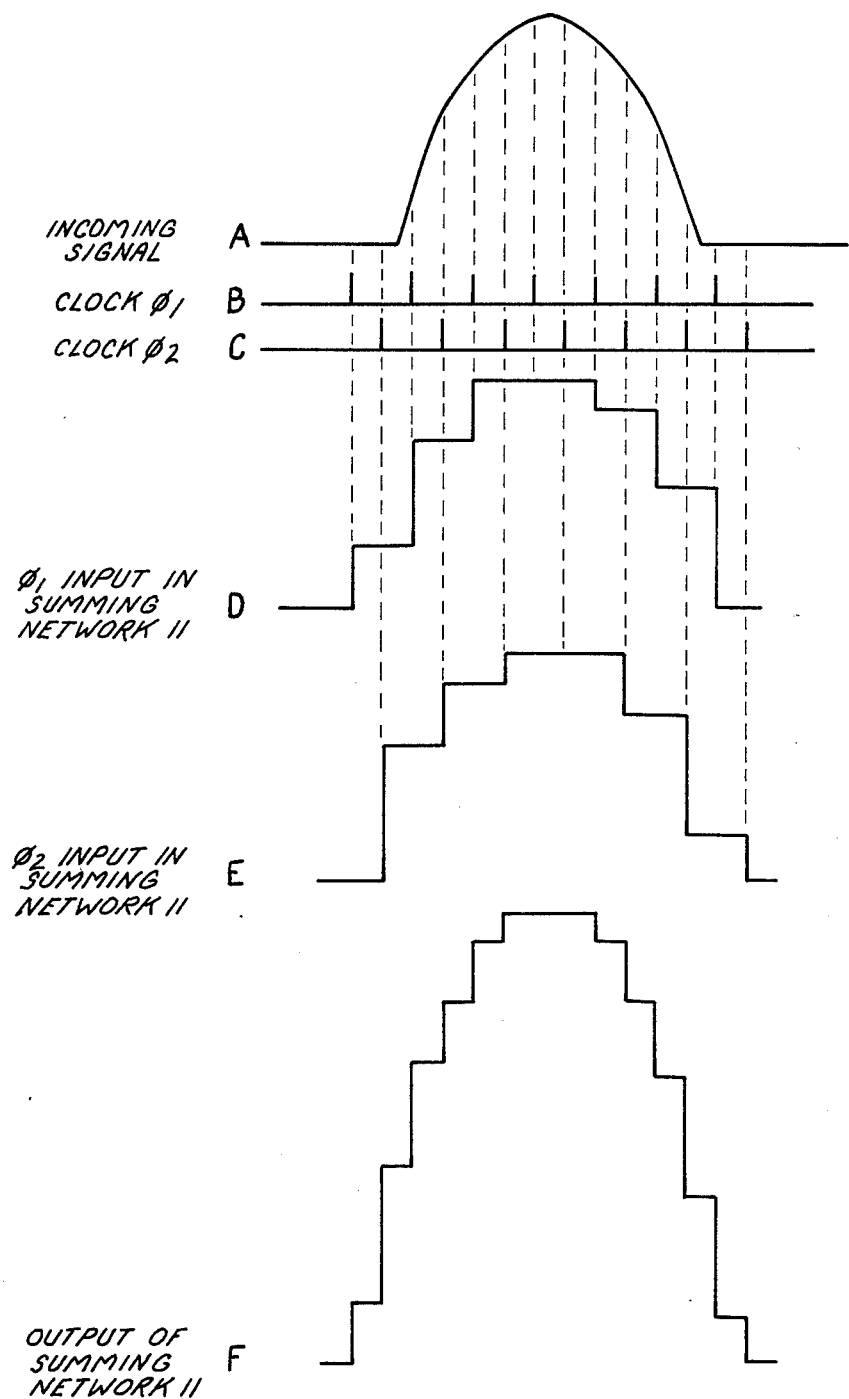

ARRANGEMENT TO PROVIDE AN ACCURATE TIME-OF-ARRIVAL INDICATION FOR A RECEIVED SIGNAL

BACKGROUND OF THE INVENTION

The present invention relates to an arrangement to provide an accurate time-of-arrival indication for a received signal in communication, navigation and identification systems and the like.

Modern communication, navigation and identification systems often require accurate time-of-arrival (TOA) measurements of a received signal. One possible receiver construction is based on the use of a matched filter whose impulse response is the time-reversed signal waveform with an appropriate delay. The matched filter acts as a signal correlator and serves to detect the received signal and to estimate the instant in time when the received signal appears to be best aligned with the stored finite-duration matched waveform.

Possible approaches of the implementation of the correlator may be by utilizing a continuous-time device, such as surface-acoustic wave (SAW) devices or a descrete-time device, such as a charged-couple-device and digital correlator. The discrete-time implementation of the signal correlator is very attractive in certain application areas where module size, cost and construction flexibility and expandability are of concern. The associated sampling losses for a discrete-time system can be classified into two areas:

(1) Sampling Signal Loss—The received signal may not be sampled at the time instant that the signal-to-noise ratio (instantaneous) is locally maximum due to the timing uncertainty.

(2) TOA Measurement Error—The accuracy of the TOA measurement is limited by the sampling rate (1/T) directly, i.e., the maximum TOA measurement error of $\pm T/2$ may occur under a single pulse observation, where T is the sampling clock time spacing.

These two associated losses may be reduced by increasing the sampling rate for better timing resolutions at the cost of circuitry complexity.

In systems using digital correlators for the TOA measurement or indication, the accuracy of the indication is a direct function of the clocking rate, the higher the rate the higher the accuracy. The accuracy is limited by the clock rate of the correlator.

SUMMARY OF THE INVENTION

An object of the present invention is to provide an improved arrangement to provide an accurate time-of-arrival indication for a received signal.

Another object of the present invention is to provide an arrangement to provide an accurate time-of-arrival indication for a received signal which increases the effective rate of the digital correlators by using staggered sampling.

A feature of the present invention is the provision of an arrangement to provide an accurate time-of-arrival indication for a received signal comprising N correlation means coupled to the received signal, where N is an integer greater than one, the received signal being clocked into each of the N correlation means by a different one of N-phase clocks, said N-phase clocks occurring at a predetermined different time uniformly spaced over a given time interval; and integration means coupled to each of the N correlation means to provide the indication of the time-of-arrival of the received signal.

BRIEF DESCRIPTION OF THE DRAWING

Above-mentioned and other features and objects of this invention will become more apparent by reference to the following description taken in conjunction with the accompanying drawing, in which:

FIG. 3 is a series of waveforms illustrating the operation of the arrangement of FIG. 1.

BRIEF DESCRIPTION OF THE PREFERRED EMBODIMENT

Figure 1:
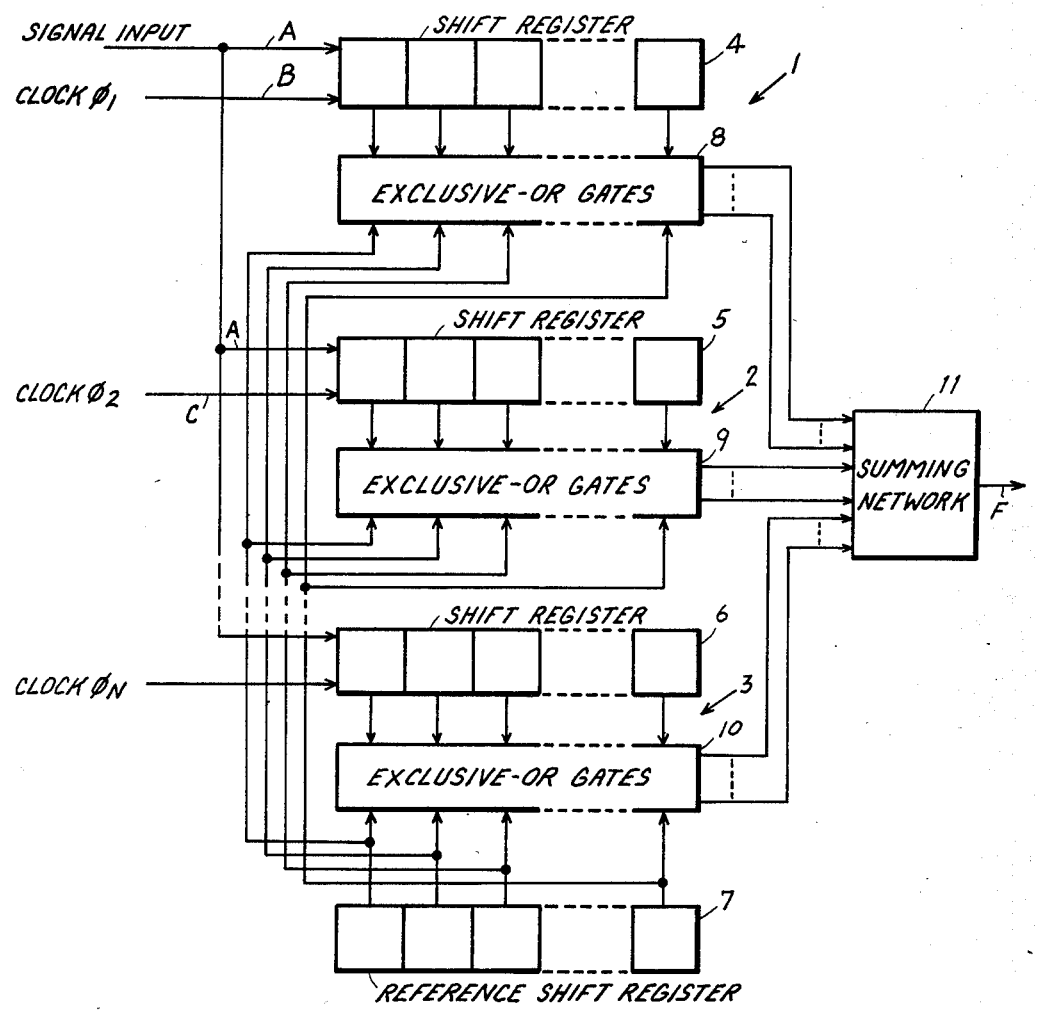
FIG. 1 is a block diagram of an arrangement to provide an accurate time-of-arrival indication for a received signal in accordance with the principles of the present invention.

Referring to FIG. 1, the arrangement in accordance with the principles of the present invention to provide an accurate time-of-arrival indication for a received signal includes a plurality of correlation means 1–3, each including signal shift registers 4–6, a common reference signal shift register 7 and EXCLUSIVE-OR gates 8–10. Gates 8–10 operate to compare the signal present in each stage of the associated signal registers 4–6 and the associated reference signal in the associated stage of the common reference signals register 7. The output of each of the EXCLUSIVE-OR gates is in accordance with the truth table for an EXCLUSIVE-OR gate as follows;

| Signal | Reference | Output of EXCLUSIVE-OR Gate |
|--------|-----------|------------------------------|
| 0 | 0 | 0 |
| 0 | 1 | 1 |
| 1 | 0 | 1 |
| 1 | 1 | 0 |

If by chance it is desired that a logic "1" be provided when the signal and reference bits are the same and to provide a logic "0" output when the signal and reference bits are different, the EXCLUSIVE-OR gate can be followed by an inverter or NOT gate. The actual circuitry used in the comparison means provided by the EXCLUSIVE-OR gates 8–10 will depend upon the logic circuitry employed in the summing network 11.

As a result of the operation of the EXCLUSIVE-OR gates of each of the correlator means 1–3, the output of the correlator means may change state with every clock signal.

Figure 2:
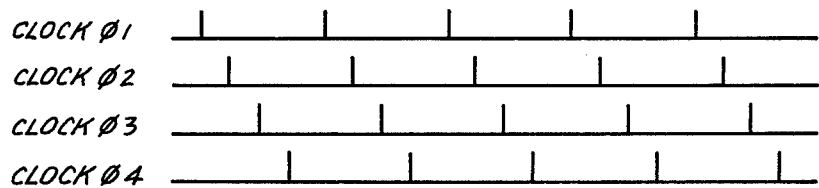
FIG. 2 illustrates an example of the multiple phase clocks employed in the arrangement of FIG. 1 when N is equal to 4.

The received signal is clocked into each of the shift registers 4–6 by an associated one of a multiphase clock where all of the clock signals have the same frequency but a different phase; in other words, separated in time as shown in FIG. 2 for a four phase clocking system.

All of the bits in each stage of the signal shift registers 4–6 are compared to the corresponding bits in the corresponding stages of the reference signal shift register 7 and the result is input to summing network 11. As a result, the output of the summing network may change states N times during one clock period.

Curve A of FIG. 3 illustrates the signal input or received signal clocked into each of the shift registers 4 and 5 by the multiphase clock illustrated in curves B and C of FIG. 3. Curves D and E of FIG. 3 illustrate the input to summing network 11 for each of the two phased clocks of curves B and C. Curve F of FIG. 3 illustrates the output of summing network 11 of FIG. 1.

It can be seen from the illustration of FIG. 3 that the output waveform of summing network 11 of FIG. 1 provides a resolution equal to that of a single correlator clocked at twice the frequency.

While we have described above the principles of our invention in connection with specific apparatus, it is to be clearly understood that this description is made only by way of example and not as a limitation to the scope of our invention as set forth in the objects thereof and in the accompanying claims.

We claim:

1. An arrangement to provide an accurate time-of-arrival indication for a received signal comprising:
    N correlation means coupled to said received signal, where N is an integer greater than one, said received signal being clocked into each of said N correlation means by a different one of N-phase clocks, said N-phase clocks occurring at a predetermined different time uniformly spaced over a given time interval; and
    integration means coupled to each of said N correlation means to provide said indication of said time-of-arrival of said received signal.

2. An arrangement according to claim 1, wherein said N correlation means includes
    N shift registers coupled to said received signal, said received signal being shifted into each of said N shift registers by said different one of said N-phase clocks,
    a reference signal shift register, and
    N comparison means each coupled to each stage of a different one of said N shift registers and each stage of said reference signal shift register to compare the contents of associated stages of said different one of said N shift registers and said reference signal shift register and produce an output signal indicative of the results of each of said comparisons.

3. An arrangement according to claim 2, wherein each of said N comparison means includes
    a plurality of EXCLUSIVE-OR gates each coupled to a different associated stage of said different one of said N shift registers and said reference signal shift register to produce said output signal indicative of the result of said comparison.

4. An arrangement according to claim 3, wherein said integration means includes a summing network coupled to each of said plurality of EXCLUSIVE-OR gates to sum said output signals to provide said indication of said time-of-arrival of said received signal.

5. An arrangement according to claim 2, wherein said integration means includes a summing network coupled to said N comparison means to sum said output signals to provide said indication of said time-of-arrival of said received signal.

6. An arrangement according to claim 1, wherein said integration means includes a summing network coupled to said N correlation means to sum output signals therefrom to provide said indication of said time-of-arrival of said received signal.

* * * * *